United States Patent Office 3,020,327
Patented Feb. 6, 1962

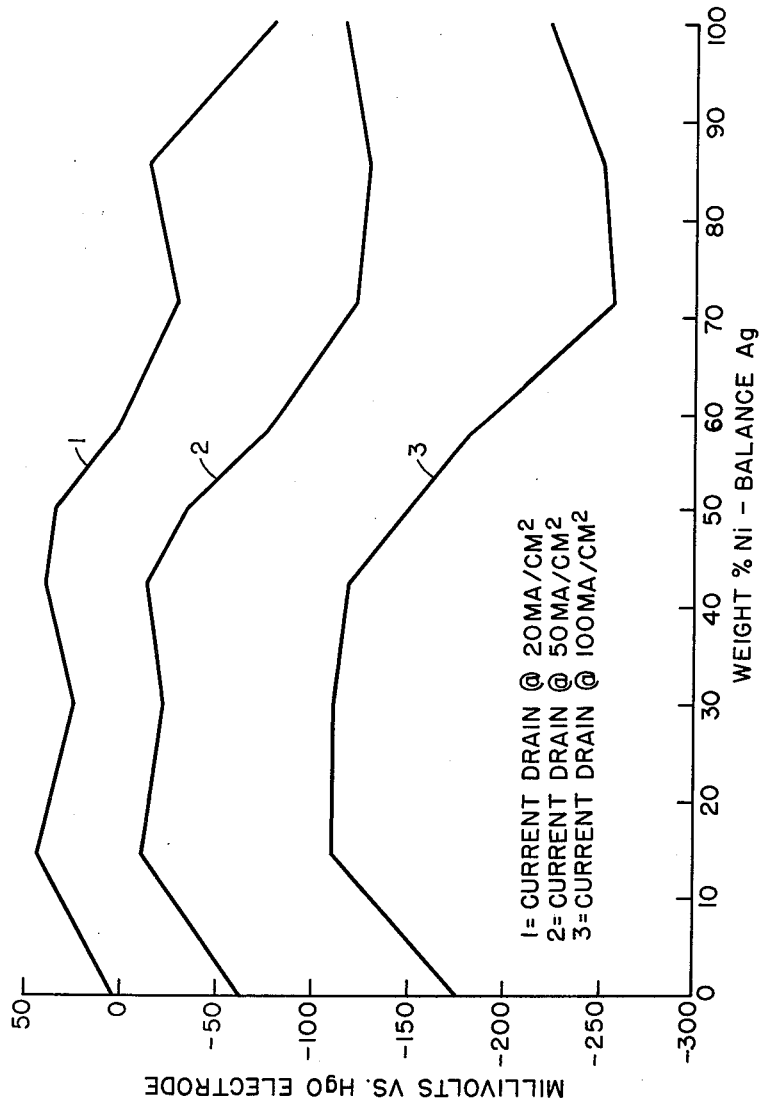

3,020,327
FUEL CELLS AND THEIR ELECTRODES
Paul Ruetschi, Glenside, Pa., assignor to The Electric Storage Battery Company, a corporation of New Jersey
Filed Aug. 11, 1959, Ser. No. 832,978
4 Claims. (Cl. 136—120)

This invention relates to fuel cells, more particularly to a new and improved electrode and to methods of producing such electrode.

It is an object of the present invention to provide a fuel cell of high efficiency for operation at relatively low temperature, that is, at room temperature, such high efficiency being derived to a large extent from the new and improved oxygen electrode used therein.

Prior to the present invention, fuel cells, devices which convert the free energy of chemical reactions directly into electricity, have for substantial current output and for improved efficiency operated at relatively high temperatures. Though low temperature fuel cell operation has been attained, much has been left to be desired in maintaining the voltage for current levels of substantial magnitude.

The present invention is particularly concerned with the provision of a fuel-cell electrode, which represents a different order of effectiveness and which provides an unexpectedly high voltage for given current output. More particularly, the fuel-cell electrode of my invention is characterized by the presence of a nickel-silver alloy in which the nickel is generally present in an amount not more than about 50% by weight of the mix and, preferably in a minor proportion.

For further objects and advantages of the invention, a description of the methods of producing the preferred form of the electrode of the present invention, and for an outline of the ways of practicing the invention, reference is to be had to the following description taken in conjunction with the drawing illustrating test results of electrodes embodying the invention.

Specifically, the electrode of the invention is designed to be used in a fuel cell designed to utilize gases, especially oxygen and hydrogen, as the reactants in an electrolyte consisting of an alkaline solution, generally an aqueous solution of potassium hydroxide. The present electrode is the one to which the oxygen gas is fed and herein is designated as the oxygen electrode. It may be used, advantageously in conjunction with a hydrogen electrode comprising a silver-palladium alloy such as is disclosed in my copending application S.N. 769,159, filed October 23, 1958, and assigned to the assignee of the present application.

As well understood by those skilled in the art, the manner in which the free energy of the chemical reaction between the gases and the electrolyte is directly converted into electricity can be expressed by the following equation:

At the oxygen electrode:

$$O_2 + 2H_2O + 4e \rightarrow 4(OH)^-  \quad (1)$$

When oxygen is supplied to the oxygen electrode, hydroxyl ions are formed within the electrolyte. In forming such ions, there is utilized an electron, thus leaving the electrode positively charged or with a deficiency of electrons. The negatively charged hydroxyl ions are diffused through the electrolyte, or migrate through the electrolyte to the hydrogen electrode.

At the hydrogen electrode:

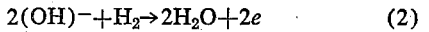

$$2(OH)^- + H_2 \rightarrow 2H_2O + 2e \quad (2)$$

With hydrogen flowing to the hydrogen electrode, the hydrogen is ionized. It reacts with the hydroxyl ions to form water with release of electrons. Accordingly, if the electrodes are connected to an external circuit, current will flow. Thus, the fuel reactions are dependent upon the flow of electrons from the hydrogen electrode through the external circuit to the oxygen electrode. In accordance with a generally recognized convention, the oxygen electrode from the standpoint of the external circuit may be considered as the positive electrode, and the hydrogen electrodes as the negative electrode.

In the preferred form of the invention, the oxygen fuel-cell electrode comprises a porous matrix consisting of sintered particles of metallic silver nickel. By the use of this electrode there has been attained an efficiency of conversion into electricity of the free energy of the chemical reaction of an unexpectedly higher order than with other oxygen electrodes known to the art particularly when it is considered that such electrode operates at about room temperature and under normal atmospheric pressures.

The oxygen electrode consists of the above mentioned alloy in the broad proportions of from about 10% to about 50% by weight of metallic nickel and from about 90% to about 50% by weight of metallic silver. It will be understood that electrodes having alloys containing nickel and silver within those ranges exhibit the improved characteristics and enhanced efficiencies of the invention. Specifically, however, my preferred electrode contains from about 15% to about 40% metallic nickel and from about 85% to about 60% of metallic silver, all proportions being by weight.

As exemplary of the improved results obtainable from the use of my electrode, reference is had to FIGURE 1 showing test results of the more efficient electrode of my invention in comparison with those electrodes known to the prior art, i.e., electrodes consisting entirely of nickel or silver. These test results are drawn from a series of discharges in which the electrodes were tested against mercury oxide electrodes in an alkaline electrolyte, namely, an aqueous solution of about 30% potassium hydroxide, at a temperature of 40° C. Oxygen was supplied to the electrodes under a pressure of about 20 pounds per square inch absolute with atmospheric pressure on the opposite side of the electrode.

Curve 1 shows the results obtained when electrodes were discharged at a current of 20 milliamperes per square centimeter. Using a prior art electrode, i.e., one consisting completely of porous silver, there was obtained a potential of +5 millivolts. Another prior art electrode, namely; one consisting completely of porous nickel, yielded a potential of —85 millivolts.

At the same current drain, electrodes containing the alloys of the invention gave from +25 millivolts to +45 millivolts. The preferred electrodes, those containing from about 15% to about 40% nickel and from about 85% to about 60% silver were productive of potentials within the range from +30 millivolts to +45 millivolts.

As the current drain per square centimeter of electrode surface was increased, the potentials of the electrodes decreased regardless of the specific nickel-silver alloy used. Nonetheless, it is significant that in curve 2, for a current drain of 50 milliamperes per square centimeter, whereas the electrodes of the prior art yielded —60 millivolts (for the silver electrode) and —110 millivolts (for the nickel electrode), the electrodes containing the alloy of the invention gave potentials ranging from —15 millivolts to —25 millivolts. Here again the preferred range showed greater efficiencies giving potentials of from —15 millivolts to —20 millivolts.

Curve 3 of FIGURE 1 illustrates the results obtained when the current drawn from the electrodes reached 100 milliamperes per square centimeter of electrode surface. Under this current drain, the silver electrode and the nickel electrode yielded −160 millivolts and −220 millivolts respectively. As compared to the heretofore known electrodes, there were obtained from the electrodes of the invention between −110 millivolts and −140 millivolts, with the preferred electrodes yielding between −110 millivolts and −125 millivolts.

The method of preparing the electrodes is important if optimum results are to be obtained. Since the electrochemical reaction in a fuel cell occurs at the gas-electrode-electrolyte interface, a prime requisite is high porosity and uniformly small pore size whereby maximum surface area is obtained. A preferred way of producing my oxygen electrode is to place in a mold and press at a light pressure a mixture of finely divided metallic nickel powder and finely divided metallic silver powder within the proportions hereinbefore set forth. The particle size of the powder is preferably such that it will pass through a 375-mesh screen. The initial firming pressure is from about 200 pounds per square inch to about 700 pounds per square inch, the range from 200 pounds to 400 pounds per square inch being preferred. For additional strength, a metallic screen, expanded metal, or other supporting member that will lend strength to the plaque but not inhibit the passage of gas therethrough may be embedded in the powder prior to pressing. The pressed plaque is then heated at a relatively low temperature to sinter the nickel and silver powder thus increasing the mechanical strength of the electrode. Low temperatures are preferred in order to retain high porosity within the electrode, a temperature of about 450° C. for a time period of about 20 minutes having been found to be satisfactory. Since the process of sintering involves a time-temperature relationship, however, higher temperatures for shorter periods of time can be utilized, as well as lower temperatures for a longer period of time.

Though the above described oxygen electrode is a preferred form, other types of oxygen electrodes may be made that will embody the inventive concept herein set forth and will fall within the scope of the appended claims. Thus, the porous matrix may be formed by sintering other metal powders, such as copper, thereby forming a porous matrix and then coating the walls of the pores with the desired nickel-silver alloy as by electrodeposition therein. Furthermore, a porous matrix comprising a porous refractory or ceramic material that is then coated with the nickel-silver alloy can also be utilized.

I claim:

1. A fuel cell electrode comprising a porous matrix, at least the pore surfaces of said matrix consisting of a nickel-silver alloy in which nickel is present in an amount by weight of the alloy of from 10% to 50% and silver is present in an amount by weight of the alloy of from 90% to 50%.

2. The electrode of claim 1 in which nickel is present in an amount by weight of from 15% to 40% and silver is present in an amount by weight of from 85% to 60%.

3. A fuel cell electrode comprising a porous alloy matrix of nickel and silver, the nickel being present in an amount by weight of said alloy of from 10% to 50% and the silver being present in an amount by weight of said alloy of from 90% to 50%.

4. The electrode of claim 3 in which the nickel is present in an amount of from 15% to 40% and the silver is present in an amount of from 85% to 60%.

References Cited in the file of this patent

UNITED STATES PATENTS

| 2,700,693 | Fischbach | Jan. 25, 1955 |
| 2,716,670 | Bacon | Aug. 30, 1955 |

FOREIGN PATENTS

| 429,513 | Great Britain | May 31, 1935 |